(No Model.)

F. P. ZIEGLER.
CONFECTION.

No. 330,659. Patented Nov. 17, 1885.

Witnesses:
E. G. Asmus
J. A. Platz.

Inventor:
Frank P. Ziegler
By Stout & Underwood
Attorneys.

UNITED STATES PATENT OFFICE.

FRANK P. ZIEGLER, OF MILWAUKEE, WISCONSIN, ASSIGNOR TO GEORGE ZIEGLER, OF SAME PLACE.

CONFECTION.

SPECIFICATION forming part of Letters Patent No. 330,659, dated November 17, 1885.

Application filed September 10, 1885. Serial No. 176,663. (No specimens.)

*To all whom it may concern:*

Be it known that I, FRANK P. ZIEGLER, of Milwaukee, in the county of Milwaukee and State of Wisconsin, have invented certain new and useful Improvements in Confections; and I do hereby declare that the following is a full, clear, and exact description thereof.

My invention relates to the manufacture of confections, and will be fully described hereinafter.

Figure 1:
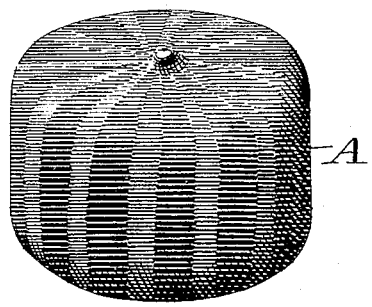
Figure 2:
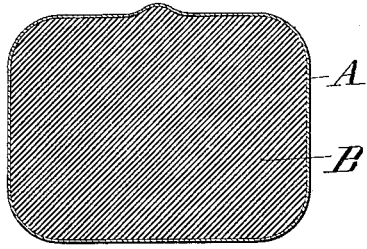

In the drawings, Figure 1 is a perspective view of a confection, and Fig. 2 is a section of the same.

A, Figs. 1 and 2, is an outer coating of a confection, which consists of paraffine. B is the body of the confection.

My invention applies particularly to "high-boiled goods" or hard candy, and the coating is applied as follows: After the candy has been cut up and hardened it is dropped into a bath of melted paraffine, and thence is carried to a cylinder or other receptacle, wherein it is permitted to drain and get rid of the surplus paraffine, and from thence is carried to a cooling-receptacle, after which it is ready for the market.

Candy treated by this process is not liable to be injured by the weather, as it will neither absorb moisture nor give it off, and, besides, this candy may be handled without becoming sticky, and yet the taste is not materially injured.

Instead of paraffine, I may use beeswax or any other substance that will perform the some office—for instance, any practically tasteless or odorless varnish.

Having thus described my invention, what I claim as new, and desire to secure by Letters Patent, is—

1. The process of treating candy, consisting in subjecting it to a bath of melted paraffine and draining it.

2. As a new article of manufacture, candy coated with paraffine.

In testimony that I claim the foregoing I have hereunto set my hand, at Milwaukee, in the county of Milwaukee and State of Wisconsin, in the presence of two witnesses.

FRANK P. ZIEGLER.

Witnesses:
 S. S. STOUT,
 G. A. PLATZ.